(12) United States Patent
Engel et al.

(10) Patent No.: US 10,217,566 B2
(45) Date of Patent: Feb. 26, 2019

(54) CERAMIC MATERIAL AND CAPACITOR COMPRISING THE CERAMIC MATERIAL

(71) Applicant: EPCOS AG, München (DE)

(72) Inventors: Günter Engel, Leibnitz (AT); Michael Schossmann, Deutschlandsberg (AT); Markus Koini, Seiersberg (AT); Andrea Testino, Genoa (IT); Christian Hoffmann, München (DE)

(73) Assignee: EPCOS AG (DE)

( * ) Notice: Subject to any disclaimer, the term of this patent is extended or adjusted under 35 U.S.C. 154(b) by 288 days.

(21) Appl. No.: 15/056,156

(22) Filed: Feb. 29, 2016

(65) Prior Publication Data

US 2016/0240318 A1   Aug. 18, 2016

Related U.S. Application Data

(62) Division of application No. 14/391,323, filed as application No. PCT/EP2013/053184 on Feb. 18, 2013, now Pat. No. 9,293,256.

(30) Foreign Application Priority Data

Apr. 10, 2012 (DE) .................. 10 2012 103 062
May 8, 2012  (DE) .................. 10 2012 104 034

(51) Int. Cl.
| | |
|---|---|
| C04B 35/472 | (2006.01) |
| H01G 4/12 | (2006.01) |
| H01G 4/30 | (2006.01) |
| C04B 35/491 | (2006.01) |
| C04B 35/493 | (2006.01) |
| C04B 35/626 | (2006.01) |
| C04B 35/50 | (2006.01) |
| H01G 4/008 | (2006.01) |
| H01G 4/012 | (2006.01) |

(52) U.S. Cl.
CPC ............ *H01G 4/30* (2013.01); *C04B 35/491* (2013.01); *C04B 35/493* (2013.01); *C04B 35/50* (2013.01); *C04B 35/62655* (2013.01); *H01G 4/008* (2013.01); *H01G 4/012* (2013.01); *H01G 4/1245* (2013.01); *C04B 2235/3201* (2013.01); *C04B 2235/3203* (2013.01); *C04B 2235/3224* (2013.01); *C04B 2235/3225* (2013.01); *C04B 2235/3227* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3291* (2013.01); *C04B 2235/3296* (2013.01); *C04B 2235/3418* (2013.01); *C04B 2235/441* (2013.01); *C04B 2235/449* (2013.01)

(58) Field of Classification Search
CPC .... C04B 35/491; C04B 35/493; H01G 4/1245
See application file for complete search history.

(56) References Cited

U.S. PATENT DOCUMENTS

| | | | | |
|---|---|---|---|---|
| 6,358,433 | B1* | 3/2002 | Tan ....................... | C04B 35/491 |
| | | | | 252/62.9 PZ |
| 6,690,571 | B2 | 2/2004 | Shindo et al. | |
| 7,781,358 | B2 | 8/2010 | Hackenberger et al. | |
| 7,855,488 | B2* | 12/2010 | Feltz .................... | C04B 35/493 |
| | | | | 310/328 |
| 7,990,029 | B2* | 8/2011 | Schossmann ......... | C04B 35/491 |
| | | | | 252/62.9 PZ |
| 8,282,755 | B2* | 10/2012 | Schossmann ......... | C04B 35/491 |
| | | | | 156/60 |
| 2003/0168624 | A1* | 9/2003 | Hammer ............... | C04B 35/491 |
| | | | | 252/62.9 PZ |
| 2006/0046921 | A1* | 3/2006 | Ito .......................... | B32B 18/00 |
| | | | | 501/136 |
| 2006/0234395 | A1* | 10/2006 | Kijima ................. | H01G 4/1245 |
| | | | | 438/3 |
| 2010/0219724 | A1* | 9/2010 | Schossmann ......... | C04B 35/491 |
| | | | | 310/365 |
| 2011/0157769 | A1* | 6/2011 | Kang ................... | C04B 35/4682 |
| | | | | 361/321.4 |
| 2011/0259502 | A1* | 10/2011 | Schossmann ......... | C04B 35/491 |
| | | | | 156/62.8 |

FOREIGN PATENT DOCUMENTS

| | | |
|---|---|---|
| DE | 197 49 858 C1 | 4/1999 |
| DE | 198 41 487 A1 | 3/2000 |
| DE | 100 62 672 A1 | 8/2001 |
| DE | 10 2007 045 089 A1 | 3/2009 |
| JP | 52-153200 | 12/1977 |
| JP | 06-338222 A | 12/1994 |

(Continued)

OTHER PUBLICATIONS

Japanese Office Action dated Feb. 3, 2016 of corresponding Japanese Application No. 2015-504886, along with a partial English translation.

Ksenia Boldyreva, "Wachstum and Struktur-Eigenschaftsbeziehungen von epitaktischen antiferroelectrisch/ferroelektrischen oxidischen Multilagen," Dissertation, Martin-Luther-Universität Halle Wittenberg, 2008, pp. 1-21.

Ajai Garg et al. "Effect of rare earth (Er, Gd, Eu, Nd and La) and bismuth additives on the mechanical and piezoelectric properties of lead zirconate titanate ceramics," Material Science and Engineering, B86, 2001, pp. 134-143.

Ajai Garg et al., "Mechanical and electrical properties of PZT ceramics (Zr:Ti = 0.40;0.60) related to Nd3+Addition," Material Science and Engineering, B60, 1999, pp. 128-132.

(Continued)

Primary Examiner — Karl E Group
(74) Attorney, Agent, or Firm — DLA Piper LLP (US)

(57) ABSTRACT

A ceramic material for capacitors using multilayer technology of formula (I): $Pb_{(1-1.5a)}A_aB_b(Zr_{1-x}Ti_x)_{(1-c-d-e-f)}C_eSi_cO_3 + y \cdot PBO$ wherein A is selected from the group consisting of La, Nd, Y, Eu, Gd, Tb, Dy, Ho, Er and Yb; C is selected from the group consisting of Ni and Cu; and $0 < a < 0.12$, $0.05 \le x \le 0.3$, $0 \le c < 0.12$, $0.001 < e < 0.12$ and $0 \le y < 1$.

10 Claims, 4 Drawing Sheets

(56) References Cited

FOREIGN PATENT DOCUMENTS

| WO | 01/45138 A2 | 6/2001 |
| WO | 02/055450 A1 | 7/2002 |
| WO | 2007/138675 A1 | 12/2007 |
| WO | 2010/108988 A1 | 9/2010 |
| WO | 2011/085932 A1 | 7/2011 |

OTHER PUBLICATIONS

H.R. Rukmini et al., "Sintering temperature dependent ferroelectric phase tr4anstion of Pb0.91 (La1-z/3 Liz) 0.09 (Zr 0.65 Ti0.35) 0.9775 O3," Journal of Physics and Chemistry of Solids, 61, 2000, pp. 1735-1743.

F.E.H. Shannigrahi et al., "Effect of rare earth (La, Nd, Sm, Eu, Gd, Dy, Er and Yb) ion substitutions on the microstructural and electrical properties of sol-gel grown PZT ceramics," Journal of the European Ceramic Society, 24, 2004, pp. 163-170.

Galeb H. Maher, "Effect of Silver Doping in the Physical and Electrical Properties of PLZT Ceramics," Journal of American Ceramic Society (online), Bd. 66, Nr. 6, Jun. 1983, pp. 408-413, XP002695406, Cincinnati, Ohio, http://onlinelibrary.wiley.com/doi/10.1111/j.1151-2916.1983.tb10071.x/abstract>.

R. Rai et al., "Effect of Fe and Mn doping at B-site of PLZT ceramics on dielectric properties," Journal of Alloys and Compounds, Elsevier Sequoia, Lausanne, CH, Bd. 487, Nr. 1-2, 2009, pp. 494-498, XP026742297, ISSN: 0925-8388.

E. Chen et al., "Ripple Current Confusion," Sep. 2004.

Ian W. Clelland et al., "Recent Advantages in Capacitor Technology with Application to High Frequency Power Electronics and Voltage Conversion," Technical Bulletin 3.99A, from proceedings of 14th Annual Applied Power Electronics Conference & Exposition, Mar. 1999.

G. Engel et al., "Effective Reduction of Leakage Failure Mode after Flex Cracking Events . . . (MLCCs)," CARTS Europe 2006 Proceedings, p. 223.

T. Kageyama et al., "Murata's Ceramic Capacitor Serves Next Series of Power Electronics," AEI, Apr. 2007, pp. 31-33.

K. Kubota et al., "Ceramic Capacitors Aid High-Voltage Designs," Power Electronics Technology, May 2004, pp. 14-23.

D.K. Mahato et al., "Effect of Na on microstructure, dielectric and piezoelectric properties of PZT ceramic," Journal of Materials Science Letters, 22, 2003, pp. 1613-1615.

D.K. Mahato et al., "Piezoelectric characteristics of spray dried PLZT ceramics modified by sodium," Journal of Materials Science, 39, 2004, pp. 3779-3781.

D.K. Mahato et al., "Synthesis and characterization of some PLZT ceramics," Journal of Materials Science: Materials in Electronics 15, 2004, pp. 575-578.

J. Prymak et al., "Technical Update—Explanation of Ripple Current Capabilities," Aug. 2004.

H.R. Rukmini et al., "Effect of sintering temperature on Na-modified PLZT ceramics," Materials Chemistry and Physics, 64, 2000, pp. 171-178.

H.R. Rukmini et al., "Effect of doping pairs (La, Na) on structural and electrical properties of PZT ceramics," Materials Chemistry and Physics, Bd. 55, 1998, pp. 108-114, XP055059231, ISSN: 0254-0584.

E. Sawyer, "Low inductance—Low Temperature Rise DC Bus Capacitor Properties Enabling the Optimization of High Power Inverters," Inter. Power Electronics Conference, May 4-6, 2010, Nürnberg, Germany.

Schuler, "Schnell geschaltet—das Sachverhalten moderner IGBT optimieren," Elektronik Journal, Nov. 2010m pp. 30-32.

TDK, "Mega Cap CKG Series," TDK Corporation of America, www.tdk.com.

T. Tsurumi et al., "Size Effect of Barium Titante and Computer-Aided Design of Multilayered Ceramic Capacitors," IEEE Transactions on Ultrasonics, Ferroelectronics and Frequency Control, vol. 56, N0. 8, Aug. 2009.

H. Vetter, "Mission Profile Based PCC Design for Integration into HEV Converter," Capacitor and Resistor Technology Symposium (Carts) Asia, 2006, Taipei, Taiwan, Oct. 9-13, 2006.

\* cited by examiner

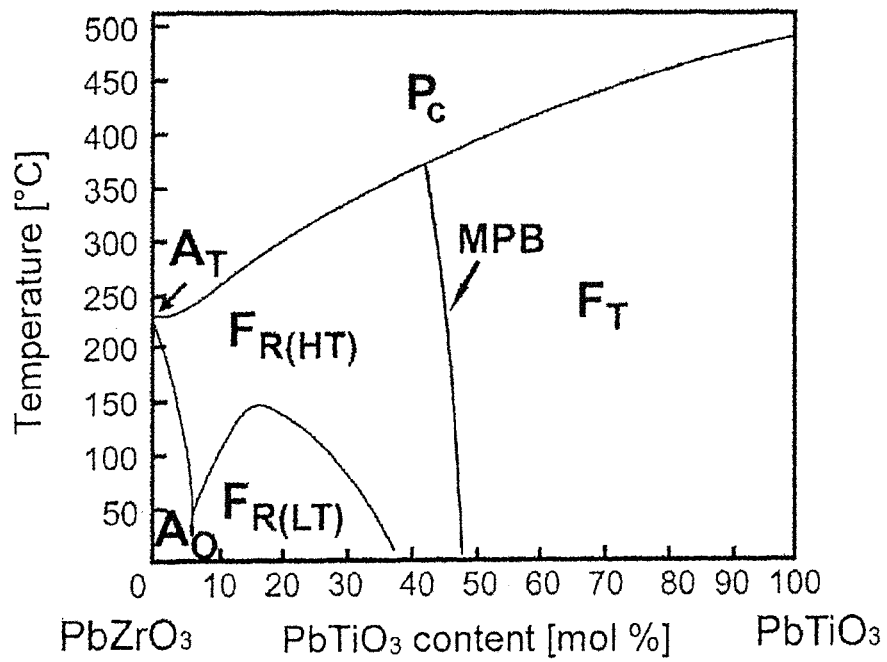
Figure 1: Phase diagram of the PbZrO₃-PbTiO₃ solid solution series
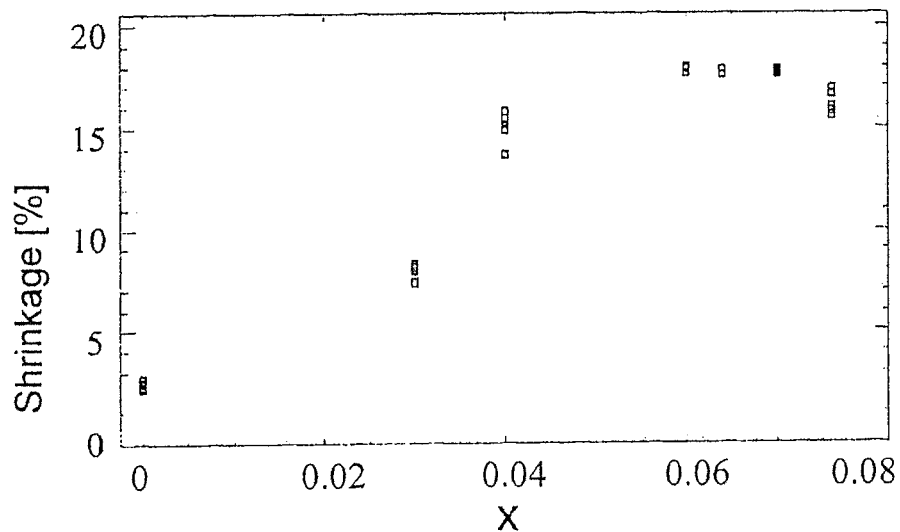
Figure 2: $Pb_{0.895-0.5x}La_{0.07}Na_xZr_{0.86}Ti_{0.14}O_3$ sintered at 1050°C. Sintering shrinkage as a function of the parameter x

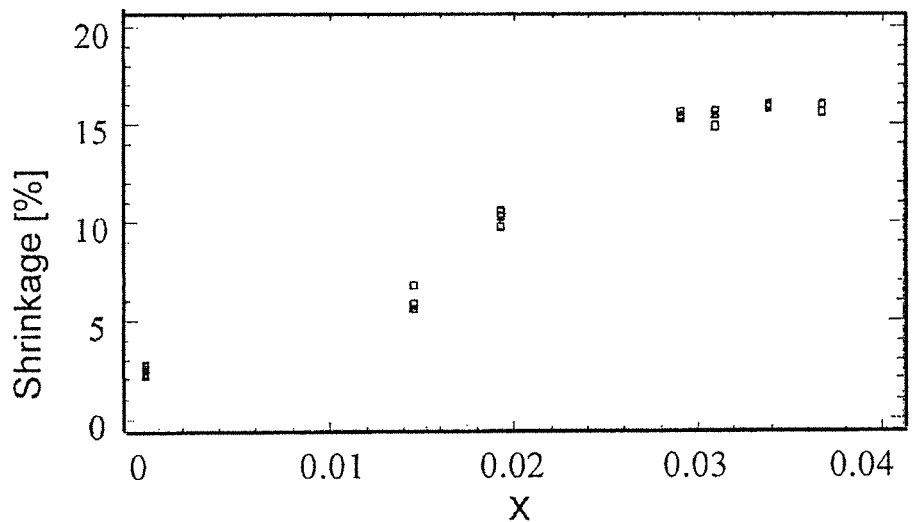
Figure 3: $Pb_{0.895+1.105x}La_{0.07(1-x)}(Zr_{0.86}Ti_{0.14})_{1-x}Ni_xO_3$ sintered at 1050°C. Sintering shrinkage as a function of the parameter x.
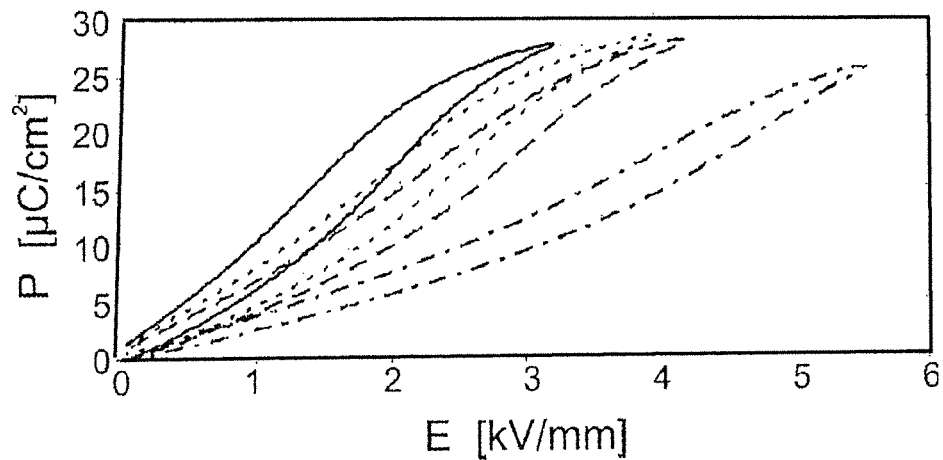
Figure 4: $Pb_{0.88-0.5x}La_{0.08}Na_xZr_{0.80}Ti_{0.20}O_3$ sintered at 1250°C. Comparison of the hysteresis curves.
—— x = 0, ····· x = 0.005, — - — x = 0.01, — — x = 0.03.

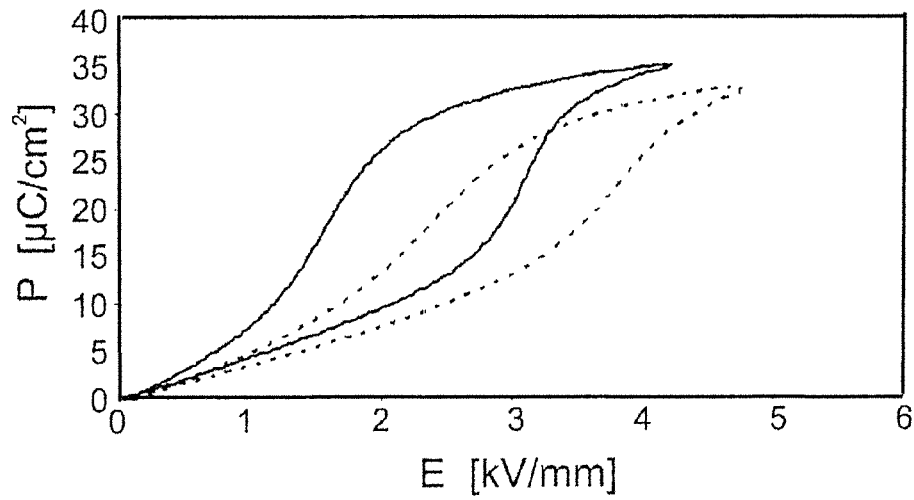
Figure 5: $Pb_{0.895+1.105x}La_{0.07(1-x)}(Zr_{0.86}Ti_{0.14})_{1-x}Ni_xO_3$ sintered at 1050°C. Comparison of the hysteresis curves.
—— $x = 0.04$, ---- $x = 0.05$
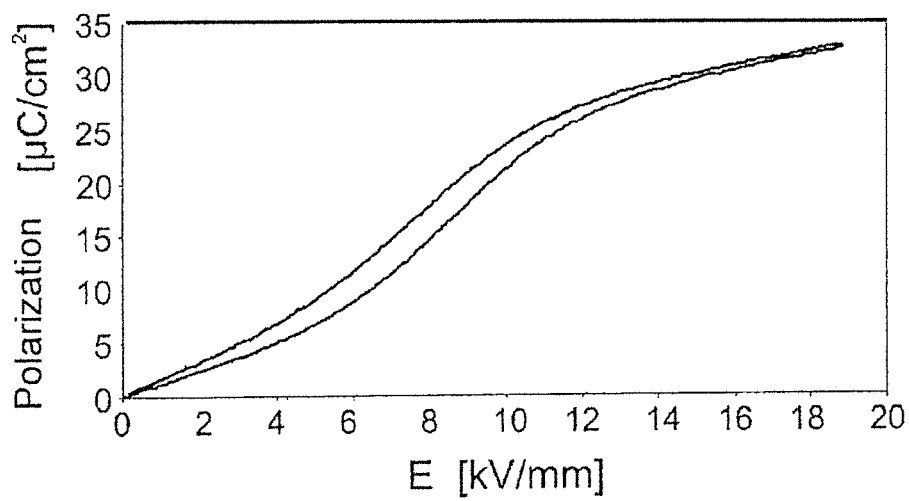
Polarization
Figure 6: $Pb_{0.87}La_{0.07}Na_{0.05}Zr_{0.86}Ti_{0.14}O_3$: hysteresis curve of a multilayer capacitor comprising Cu electrodes.

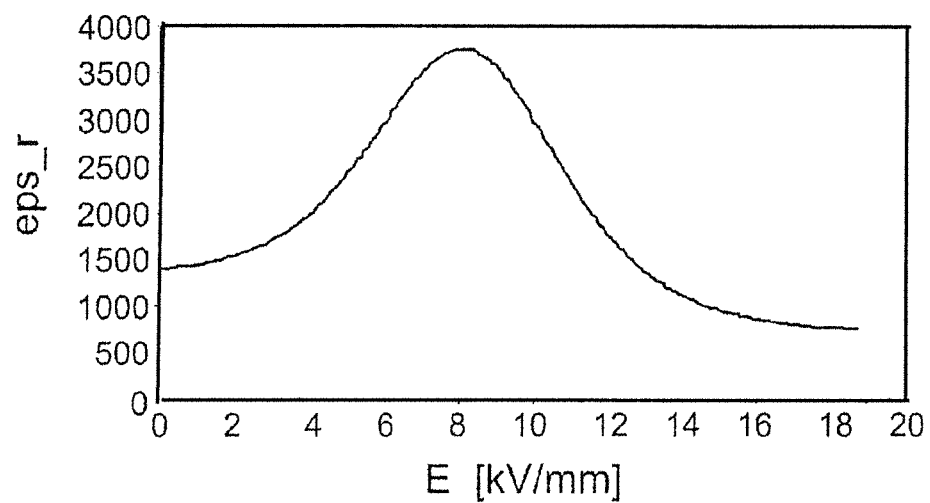
Figure 7 (real measurement): $Pb_{0.87}La_{0.07}Na_{0.05}Zr_{0.86}Ti_{0.14}O_3$: relative permittivity resulting from the differentiation of the lower branch of the hysteresis curve in figure 6.

CERAMIC MATERIAL AND CAPACITOR COMPRISING THE CERAMIC MATERIAL

RELATED APPLICATION

This is a divisional of U.S. Ser. No. 14/391,323, with a filing date of Oct. 8, 2014 (now, U.S. Pat. No. 9,293,256, issued Mar. 22, 2016), which is a 371 of International Application No. PCT/EP2013/053184, with an international filing date of Feb. 18, 2013, (WO 2013/152887 A1, published Oct. 17, 2013), which is based on German Patent Application No. 10 2012 103 062.6, filed Apr. 10, 2012, and German Patent Application No. 10 2012 104 034.6, filed May 8, 2012.

TECHNICAL FIELD

This disclosure relates to a ceramic material suitable for capacitors using multilayer technology and a capacitor comprising the ceramic material, the capacitor preferably being suitable for high-power applications. The capacitor can be used as a filter element in an AC/DC or DC/DC converter.

BACKGROUND

Ceramic capacitors comprise at least two electrical conductors between which a dielectric (insulating) ceramic layer is arranged. The properties of ceramic capacitors are essentially determined by the polarization properties of the ceramic dielectric. Materials which have a spontaneous polarization in the absence of an electric field are referred to as pyroelectric. If the direction of the spontaneous polarization can be changed by an electric field (or a mechanical stress) being applied, the materials are called ferroelectric. If, during the phase transition from the paraelectric phase, the ions of a ferroelectric are not displaced parallel to one another, but rather antiparallel to one another, the material is referred to as antiferroelectric.

One ceramic material that has been used heretofore principally for piezoelements is the lead zirconate titanate system ($Pb(Zr_xTi_{1-x})O_3$ or PZT). The latter constitutes a solid solution (continuous solid solution series) of the antiferroelectric lead zirconate ($PbZrO_3$) and the ferroelectric lead titanate ($PbTiO_3$, PTO), which can have both ferroelectric and antiferroelectric properties depending on the composition. The phase diagram in FIG. 1 shows how the Curie temperature and crystal symmetry of the PZT system depend on the composition thereof. FT and FR are ferroelectric tetragonal and rhombohedral phases, respectively. PC denotes the paraelectric cubic phase. AO and AT stand for antiferroelectric orthorhombic and tetragonal phases, respectively. HT stands for the high-temperature phase, and LT stands for the low-temperature phase. Proceeding from PTO, the Curie point is reduced from 490° C. (Tc (PTO)) to 230° C. (Tc (PZO)) in the case of substitution of titanium ions by zirconium ions; in this case, the symmetry changes from FT through FR to AO (at room temperature). PZT is paraelectric above Tc. When the temperature falls below the Curie temperature, virtually a distortion of the cubic structure takes place, to be precise depending on the Zr/Ti ratio. In other words, the Ti-rich PZT solid solutions are ferroelectric and tetragonal at room temperature, in contrast to the Zr-rich PZT solid solutions, which are antiferroelectric-orthombic (O-phase) or ferroelectric-rhombohedral. PZT materials have been used heretofore principally for piezoelements, e.g., piezoactuators. The piezoelectric properties required therefor are particularly pronounced at the so-called morphotropic phase boundary (MPB), which separates the two FE phases (FT and FR); in this case, two different crystal structures form only after slight variation of the Zr/Ti ratio. The MPB lies between $PbZr_{0.6}Ti_{0.4}O_3$ and $PbZr_{0.55}Ti_{0.45}O_3$.

WO 2011/085932 A1 discloses a capacitor comprising a heating element and a capacitor region comprising dielectric layers and internal electrodes arranged between the dielectric layers, wherein the heating element and the capacitor region are thermally conductively connected to one another.

It could therefore be helpful to provide a ceramic material suitable for capacitors using multilayer technology and having improved properties.

SUMMARY

We provide a ceramic material for capacitors using multilayer technology of formula (I): $Pb_{(1-1.5a-0.5b+1.5d+e+0.5f)}A_aB_b(Zr_{1-x}Ti_x)_{(1-c-d-e-f)}Li_cC_eFe_fSi_cO_3 + y \cdot PbO$ wherein A is selected from the group consisting of La, Nd, Y, Eu, Gd, Tb, Dy, Ho, Er and Yb; B is selected from the group consisting of Na, K and Ag; C is selected from the group consisting of Ni, Cu, Co and Mn; and $0 < a < 0.12$
$0.05 \leq x \leq 0.3$
$0 \leq b < 0.12$
$0 \leq c < 0.12$
$0 \leq d < 0.12$
$0 \leq e < 0.12$
$0 \leq f < 0.12$
$0 \leq y < 1$, wherein $b+d+e+f>0$.

We further provide a ceramic material for capacitors using multilayer technology of formula (I): $Pb_{(1-1.5a)}A_aB_b(Zr_{1-x}Ti_x)_{(1-c-d-e-f)}C_eSi_cO_3 + y \cdot PbO$ wherein A is selected from the group consisting of La, Nd, Y, Eu, Gd, Tb, Dy, Ho, Er and Yb; C is selected from the group consisting of Ni and Cu; and $0 < a < 0.12$
$0.05 \leq x \leq 0.3$
$0 \leq c < 0.12$
$0.001 < e < 0.12$
$0 \leq y < 1$.

We also provide a capacitor including at least one ceramic layer composed of the ceramic material; and a conductive electrode formed on the at least one ceramic layer.

BRIEF DESCRIPTION OF THE DRAWINGS

FIG. 1 shows a phase diagram of the $PbZrO_3$—$PbTiO_3$ solid solution series. FT and FR are ferroelectric tetragonal and rhombahedral phases, respectively. PC denotes the paraelectric cubic phase. AO and AT stand for antiferroelectric orthorhombic and tetragonal phases, respectively. HT stands for high-temperature phase, and LT stands for low-temperature phase.

FIG. 2 shows the sintering shrinkage as a function of the parameter x for the ceramic material $Pb_{0.895-0.5x}La_{0.07}Na_xZr_{0.86}Ti_{0.14}O_3$, which was sintered at 1050° C.

FIG. 3 shows the sintering shrinkage as a function of the parameter x for the material $Pb_{0.895+1.105x}La_{0.07(1-x)}(Zr_{0.86}Ti_{0.14})_{1-x}Ni_xO_3$, which was sintered at 1050° C.

FIG. 4 shows a comparison of hysteresis curves of the material $Pb_{0.88-0.5x}La_{0.08}Na_xZr_{0.80}Ti_{0.20}O_3$, which was sintered at 1250° C. The hysteresis curves are shown for x =0, x=0.005, x=0.01, x=0.03.

FIG. 5 shows a comparison of hysteresis curves for the ceramic material $Pb_{0.895+1.105x}La_{0.07}(1-x)(Zr_{0.86}Ti_{0.14})_{1-x}Ni_xO_3$, which was sintered at 1050° C. Hysteresis curves for x=0.04 and x=0.05 are shown.

FIG. 6 shows the hysteresis curve of a multilayer capacitor comprising Cu electrodes for the ceramic material $Pb_{0.87}La_{0.07}Na_{0.05}Zr_{0.86}Ti_{0.14}O_3$.

FIG. 7 shows the relative permittivity (dielectric constant) for the ceramic material $Pb_{0.87}La_{0.07}Na_{0.05}Zr_{0.86}Ti_{0.14}O_3$, thus resulting from the differentiation of the lower branch of the hysteresis curve from FIG. 6.

DETAILED DESCRIPTION

We provide a particularly Zr-rich PZT solid-solution phase selected from the phase diagram. Moreover, the condition b+d+e+f>0 stipulates that our ceramic material must contain at least one element from the group consisting of Li, Na, K, Ag, Fe, Ni, Cu, Co and Mn (lithium, iron and groups B and C) besides a dopant from the defined group A (rare earth element). As a result, a ceramic material which is sinterable at temperatures of 1000° C. to 1120° C. can be provided, which enables a combination with other substances/materials, not stable at relatively high temperatures, as early as during the method of producing the ceramic material. By way of example, it becomes possible to sinter the ceramic material ("co-firing" method) with internal electrodes composed of base metals such as silver or copper, for instance. Moreover, the ceramic material has a higher switching field strength and/or higher relative permittivity (dielectric constant) compared with the PZT material doped only by group A.

Moreover, low sintering temperatures promote formation of small grain sizes of the ceramic material, which has a favorable influence on the dielectric properties. More precisely, the dielectric properties of PZT ceramics are generally also determined by the domain size. Domains are understood to mean regions in the ceramic with the same polarization. The domain size depends on the grain size. The number of domains per grain increases as the grain size increases. The changed domain size has consequences for the material properties of the ceramic. It is thus desirable to be able to control the grain size or grain growth.

Typically, the doped lead zirconate titanate ceramic has a perovskite lattice, which can be described by the general formula $ABO_3$, wherein A denotes the A-sites and B denotes the B-sites of the perovskite lattice.

The perovskite lattice is distinguished by a high tolerance toward dopings and vacancies.

The perovskite structure of lead zirconate titanate (PZT) can be described by the general formula $ABO_3$. A unit cell of the PZT crystal lattice can be described by a cube. The A-sites are occupied by $Pb^{2+}$ ions situated on the corners of the cube. An $O^{2-}$ ion is in each case situated in the center of each cube face. A $Ti^{4+}$ ion and a $Zr^{4+}$ ion (B-sites) are situated in the center of the cube. This structure has a high tolerance toward substitution of the metal ions by other metal ions and defects, for which reason it can be doped well.

Distortion of the highly symmetrical coordination polyhedron can occur depending on the difference in size between the ion introduced by doping and the substituted ion. This distortion can change the center of symmetry of the crystal and thus influence polarizability.

The different doping possibilities can be classified on the basis of the valency of the doping ion. Isovalent doping, that is to say the substitution of one ion by another ion having the same valency, does not affect possible vacancies in the ceramic material. If cations of low valency (acceptors) replace cations having a higher valency, then vacancies are generated in the anion lattice. Cations of higher valency (donors), if they replace cations of lower valency, cause vacancies in the cation lattice. Doping with acceptors and donors leads in each case to characteristic changes in the material properties. Acceptor-doped ceramics are also designated as "hard" ceramics, and donor-doped ceramics as "soft" ceramics.

A doping, for example, with $Nd^{3+}$ (or some other rare earth element from group A), on the A-sites constitutes a donor doping. On account of the ionic radius of neodymium, the latter is incorporated on the $Pb^{2+}$ sites. Charge equalization takes place as a result of the corresponding formation of Pb vacancies. The doping brings about metric changes in the lattice and the influencing of longer-acting interactions between the unit cells.

A doping, for example, with $K^+$ or $Fe^{3+}$, on the A- or B-sites, constitutes an acceptor doping. On account of the ionic radius of potassium, the latter is incorporated on the $Pb^{2+}$ sites, while $Fe^{3+}$ is incorporated on the $Zr^{4+}$ or $Ti^{4+}$ sites. The charge equalization takes place as a result of the reduction of $Pb^{2+}$ vacancies (A-vacancies) and/or the corresponding formation of oxygen vacancies. The doping brings about grain growth and oxygen vacancy formation which provides sintering densification and which is induced by K acceptors at the sintering temperature. In the cooling process, recombination with the Nd donors with formation of quasi-neutral {Nd/K} defect pairs can take place such that no or only a very low lead or oxygen vacancy concentration is present in the finished ceramic.

This doping affects the grain growth of the material, which depends on the concentration of the introduced doping. In this case, small amounts of doping contribute to the grain growth, whereas excessively large amounts of doping ions can inhibit the grain growth.

The properties of donor-doped PZT materials such as are present when Nd occupies Pb sites, is substantially based on an increased domain mobility caused by the Pb vacancies. The vacancies have the effect that the domains can already be influenced by small electric fields. This leads to an easier displaceability of the domain boundaries and thus to higher dielectric constants compared to undoped PZT ceramics.

Acceptor and donor dopings need to be present simultaneously in the ceramic material. This has the effect that the negative properties which occur when the ceramic was doped with only one of the two types of doping are compensated for. By way of example, if only an acceptor doping were present such that this often leads to decreasing dielectric constants, that is to say that the constants are less than those of the undoped ceramic. If only a donor doping is present, then the grain growth is inhibited and the bodies of the ceramic do not attain the desired size. The combination of the dopings present contrasts positively with the undoped ceramic in these points, however. It has higher dielectric constants, which is the case even at lower sintering temperatures.

Preferably, $0.1 \leq x \leq 0.2$ holds true since the polarization curves can be set better in this range.

Preferably, it holds true that $0 \leq y < 0.05$.

Preferably, it holds true that $0.001 < b < 0.12$, wherein with further preference d=e=f=0 holds true.

Preferably, it holds true that $0.001 < e < 0.12$, wherein with further preference b=d=f=0 holds true.

Further preferably, B is sodium (Na). The material properties are influenced particularly advantageously as a result of this. In particular, the sintering temperature is reduced in comparison with PZT material containing only a rare earth element, and the switching field strength is increased at the same time.

Further preferably, the relative permittivity at an electric field strength of 1 kV/mm, preferably 2 kV/mm, is at least 60% of the relative permittivity at an electric field strength of 0 kV/mm. With further preference, the relative permittivity (dielectric constant) of the ceramic material at a field strength of 2 to 5 kV/mm, preferably 1 kV/mm to 10 kV/mm, is at least 60% of the relative permittivity at an electric field strength of 0 kV/mm. The measurements are preferably carried out at a temperature of the ceramic material of 125° C.

Further preferably, the ceramic material has a relative permittivity of at least 500, preferably at least 1500, at an electric field strength of 1 kV/mm, preferably 2 kV/mm. With further preference, the ceramic material has a relative permittivity of at least 500, preferably at least 1500, at an electric field strength of 2 to 5 kV/mm, preferably 1 kV/mm to 10 kV/mm. The measurements are preferably carried out at a temperature of the ceramic material of 125° C.

The measurement of polarization hysteresis is a standard method of determining relative permittivity (dielectric constant). For frequency-independent measurement, quasi-static methods are known wherein the hysteresis loop is measured point by point. By way of example, polarization measurements can be carried out with the aid of the TF Analyser 2000 from aixACCT Systems GmbH.

Further preferably, the ceramic material is an antiferroelectric dielectric. For this purpose, the basic material PZT is preferably used from the antiferroelectric-orthorhombic phase region (O-phase). The antiferroelectric order is characterized by a superimposition of a plurality of polar sublattices, the electric dipole moments of which cancel one another out. An antiferroelectric crystal thus has no spontaneous polarization, but does have special dielectric properties. If an electric field is applied to the antiferroelectric, it behaves first like a linear dielectric. Starting from a specific critical field strength, an abrupt transition to the ferroelectric phase is induced and the formerly antiparallel dipoles flip over to the then energetically more expedient, parallel, orientation. By contrast, the opposite transition takes place at a lower field strength. This results in a so-called double hysteresis loop (as shown in FIGS. 4 to 6, which each show only the hysteresis loops for positive values of the electric field).

Antiferroelectric ceramic materials have a less highly pronounced polarization-field strength hysteresis compared to ferroelectric ceramic materials. This results in lower energetic losses in use in capacitors. For this reason, the use of antiferroelectric ceramic materials is preferred.

To produce pure and differently doped lead zirconate titanate (PZT) powders, it is possible to use the traditional mixed oxide method or else solvent-based methods, also called "sol-gel" methods. The starting point is, e.g., solutions of the acetates or alkoxides of the constituent metals, which are converted into granulated xerogels, the ceramic precursor substances, by various drying methods. By way of example, spray drying and spray freeze granulation with subsequent freeze drying are available for the drying. The precursors are subsequently pyrolyzed to form the oxides. Powders produced in this way can be deagglomerated with little outlay and be conditioned for further processing.

We also provide a capacitor comprising at least one ceramic layer composed of the ceramic material as defined above, and a conductive electrode formed on the at least one ceramic layer.

Preferably, the conductive electrode is arranged between adjacent ceramic layers. Also preferably, the capacitor is a multilayer capacitor formed as a monolithic sintering body made from alternate ceramic layers and electrode layers.

Further preferably, the conductive electrode comprises a base metal, preferably Ag or Cu. With further preference, the internal electrodes comprise Cu. With particular preference, the base metals form the main constituent of the internal electrodes.

Further preferably, the capacitor has a current-carrying capacity of at least 1 A/µF in the range of 80° C. to 150° C., preferably in the range of −40° C. to 150° C. To produce the ceramic capacitor, a thin ceramic sheet is drawn, for example, from a suspension of the unsintered ceramic powder with a suitable binder. The sheet is printed with a metal paste, the future electrodes, by the screen printing method. The metal paste can contain Cu, Ag or Pd. Base metals, such as Ag and Cu, for instance, are preferably used since the production process is made less expensive in this way. The printed sheets are stacked one above another in the number of layers required for the capacitor and are consolidated by pressing. Besides the relative permittivity (dielectric constant) of the ceramic, the number of layers one above another and the layer thickness determine the later capacitance of the capacitor. The printing and stacking can be carried out by the electrodes in the stack being stacked alternately in a manner slightly offset with respect to one another such that they can be contact-connected later in a comb-like manner on one side with the connection areas.

The stacked and pressed stack is subsequently divided into the individual capacitors.

After cutting, first the binder is baked from the singulated capacitors. The firing process then takes place. In this case, the ceramic powder is sintered at temperatures of 1000 to 1450° C., preferably at 1000° C. to 1120° C., and acquires its final, predominantly crystalline structure. It is only as a result of this firing process that the capacitors acquire their desired dielectric behavior. The firing process is followed by cleaning and then the outer metallization for the two external electrodes. The internal electrodes connect in parallel by these metallizations at the end faces of the ceramic block. At the same time, the metallizations are the external electrical connection areas.

The particular properties of the ceramic material are explained below with reference to figures.

FIGS. 2 and 3 show how the sintering shrinkage can be controlled by the relative amount (parameter x) of Na and Ni, respectively.

For Na, a sintering shrinkage of more than 15% arises at a temperature of 1050° C. for a value of x=0.06. Without Na, a comparable sintering shrinkage is achieved only at temperatures of 1260° C. (FIG. 2). Consequently, sintering can be carried out low temperatures in the presence of sodium in the ceramic material.

A similar result arises for the sintering aid Ni. In FIG. 3, the ceramic material $Pb_{0.895+1.105x}La_{0.07(1-x)}(Zr_{0.86}Ti_{0.14})_{1-x}Ni_xO_3$ was sintered at 1050° C. A maximum sintering shrinkage of more than 15% arose for values of the parameter x of more than 0.03. Consequently, sintering can be carried out at low temperatures in the presence of nickel in the ceramic material.

In FIG. 4, the influence of the parameter x on the polarizability and the switching field strength is shown for the ceramic material $Pb_{0.88-0.5x}La_{0.08}Na_xZr_{0.80}Ti_{0.20}O_3$, which was sintered at 1250° C. With higher values for x, that is to say a greater proportion constituted by Na in the ceramic material, a lower polarizability and an increase in the switching field strength arise, which is manifested in a flattening of the hysteresis loops.

A similar result arises in FIG. 5 for the ceramic material $Pb_{0.895+1.105x}La_{0.07(1-x)}(Zr_{0.86}Ti_{0.14})_{1-x}Ni_xO_3$, which was sintered at 1050° C. The comparison for the parameter x with 0.04 and 0.05 shows that, when the proportion constituted by Ni in the ceramic material increases, the polarizability decreases and the switching field strength increases.

FIG. 6 shows a hysteresis curve for a multilayer capacitor comprising Cu electrodes, this capacitor comprising the ceramic material $Pb_{0.87}La_{0.07}Na_{0.05}Zr_{0.86}Ti_{0.14}O_3$. The ceramic material exhibits a high switching field strength of approximately 8 kV/mm. The high switching field strength makes it possible to store a relatively large amount of energy in the capacitor. Moreover, the ceramic material has low polarization-field strength hysteresis, as a result of which the capacitor has only low energetic losses.

FIG. 7 shows the relative permittivity (dielectric constant) which results from the differentiation of the lower branch of the hysteresis curve from FIG. 6. A profile which is characteristic of an antiferroelectric material results. The relative permittivity attains a maximum of 3800 at approximately 8 kV/mm. This maximum corresponds to the switching field strength.

The invention claimed is:

1. A capacitor comprising:
    at least one ceramic layer composed of a ceramic material for capacitors using multilayer technology of formula (I):

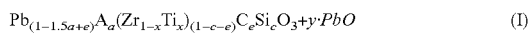

$$Pb_{(1-1.5a+e)}A_a(Zr_{1-x}Ti_x)_{(1-c-e)}C_cSi_eO_3 + y \cdot PbO \quad (I)$$

wherein
   A is selected from the group consisting of La, Nd, Y, Eu, Gd, Tb, Dy, Ho, Er and Yb;
   C is selected from the group consisting of Ni and Cu; and
   $0 < a < 0.12$
   $0.05 \le x \le 0.3$
   $0 \le c < 0.12$
   $0.001 < e < 0.12$
   $0 \le y < 1$, and
   a conductive electrode formed on the at least one ceramic layer, wherein the current-carrying capacity at 100° C. is at least 1A/μF.

2. The capacitor according to claim 1, wherein the conductive electrode is arranged between adjacent ceramic layers.

3. The capacitor according to claim 1, wherein the conductive electrode comprises a base metal.

4. The capacitor according to claim 1, wherein the current-carrying capacity is at least 1A/μF at −40° C. to 150° C.

5. The capacitor according to claim 4, wherein the base metal is Ag or Cu.

6. The capacitor according to claim 1, wherein the current-carrying capacity is at least 1A/μF at 80° C. to 150° C.

7. The capacitor according to claim 2, wherein the current-carrying capacity is at least 1A/μF at −40° C. to 150° C.

8. The capacitor according to claim 2, wherein the current-carrying capacity is at least 1A/μF at 80° C. to 150° C.

9. The capacitor according to claim 3, wherein the current-carrying capacity is at least 1A/μF at −40° C. to 150° C.

10. The capacitor according to claim 3, wherein the current-carrying capacity is at least 1A/μF at 80° C. to 150° C.

* * * * *